US 11,295,160 B2

(12) United States Patent
Huang et al.

(10) Patent No.: US 11,295,160 B2
(45) Date of Patent: Apr. 5, 2022

(54) IMAGE ADAPTIVE FEATURE EXTRACTION METHOD AND APPLICATION THEREOF

(71) Applicant: National Chung-Shan Institute of Science and Technology, Taoyuan (TW)

(72) Inventors: Shih-Shinh Huang, Tainan (TW); Shih-Che Chien, Hsinchu (TW); Feng-Chia Chang, Taoyuan (TW); Yu-Sung Hsiao, Taoyuan (TW); Chien-Hao Hsiao, Hsinchu (TW)

(73) Assignee: National Chung-Shan Institute of Science and Technology, Taoyuan (TW)

(*) Notice: Subject to any disclaimer, the term of this patent is extended or adjusted under 35 U.S.C. 154(b) by 56 days.

(21) Appl. No.: 16/676,453

(22) Filed: Nov. 7, 2019

(65) Prior Publication Data

US 2020/0160088 A1    May 21, 2020

(30) Foreign Application Priority Data

Nov. 19, 2018   (TW) .................................. 107141355

(51) Int. Cl.
  *G06K 9/46*    (2006.01)
  *G06T 7/223*   (2017.01)

(52) U.S. Cl.
  CPC ......... *G06K 9/4642* (2013.01); *G06K 9/4671* (2013.01); *G06T 7/223* (2017.01); *G06T 2207/20021* (2013.01)

(58) Field of Classification Search
  CPC ........... G06T 7/223; G06T 2207/30196; G06T 2207/10048; G06T 2207/20081;
  (Continued)

(56) References Cited

U.S. PATENT DOCUMENTS

2010/0272366 A1* 10/2010 Meng ................. G06K 9/34
  382/190
2012/0083960 A1*  4/2012 Zhu .................. G01C 21/3617
  701/23
2015/0131848 A1*  5/2015 Thirumaleshwara ......................
  G06K 9/00624
  382/103

FOREIGN PATENT DOCUMENTS

KR     20150136971 A  * 12/2015

OTHER PUBLICATIONS

Liu, Yifeng, Lin Zeng, and Yan Huang. "An efficient HOG-ALBP feature for pedestrian detection." Signal, Image and Video Processing 8.1 (2014): 125-134. (Year: 2014).*

* cited by examiner

*Primary Examiner* — Pinalben Patel
(74) *Attorney, Agent, or Firm* — Winston Hsu

(57) ABSTRACT

An image adaptive feature extraction method includes dividing an image into a plurality of blocks, performing a feature extraction processing on the plurality of blocks, and obtaining a block feature from each of the plurality of blocks after the feature extraction processing; calculating each block feature by means of a support vector machine (SVM) classifier, wherein each block feature is calculated to obtain a hyperplane normal vector; setting a threshold value, determining the block feature according to the hyperplane normal vector, recording the block as an adaptive feature block when a value of the hyperplane normal vector is higher than the threshold value, and integrating each adaptive feature block to form an adaptive feature image. Because an image adaptive feature extraction process is performed before a pedestrian image detection is calculated, and effective feature data is then selected, computational efficiency is (Continued)

boosted and detection pedestrian error probability is reduced.

8 Claims, 4 Drawing Sheets

(58) Field of Classification Search
CPC ............ G06T 2207/20021; G06T 7/73; G06K 9/2018; G06K 9/6269; G06K 9/00624; G06K 9/4642; G06K 9/4671
See application file for complete search history.

IMAGE ADAPTIVE FEATURE EXTRACTION METHOD AND APPLICATION THEREOF

BACKGROUND OF THE INVENTION

1. Field of the Invention

The present invention relates to an image feature extraction method, and more particularly, to an image adaptive feature extraction method for improving computational efficiency.

2. Description of the Prior Art

In the conventional pedestrian detection technology, classifier learning is currently technologically mature and basically involves machine learning. In classifier learning, a training database including a great deal of humanoid samples and non-humanoid samples is provided, and a classifier such as Adaboost (adaptive boosting) and support vector machine (SVM) is trained to effectively discriminate between humanoid and non-humanoid. Therefore, effectiveness of the extracted features plays a crucial role in a thermal image pedestrian detection algorithm. Common thermal image pedestrian features mainly include Haar-like features, histogram of oriented gradients (HOG), local binary pattern (LBP), intensity self-similarity (ISS) or other related variant features. Considering complementarity of different features, integrating various thermal image features is a popular technique recently so as to improve detection accuracy and meet commercial requirements. Besides, the integration approach directly cascades various features to obtain a more distinguishable high-dimensional feature.

Although the aforementioned feature integration approach may effectively enhance the accuracy of thermal image pedestrian detection, there are two drawbacks. First, by directly cascading feature vectors, distinguishability may be effectively increased. However, a so-called curse of dimensionality problem occurs during machine learning because its dimension is too high. That is, when a parameter space dimension increases, a dimension space volume expands so fast that trained data becomes sparse, which invalids the classifier following statistical principles in the machine learning processes. Secondly, features of different characteristics may be highly correlated, which leads to overlapping between data corresponding to the high-dimensional feature(s) generated by feature cascading, thereby increasing detection errors.

Therefore, an image adaptive feature extraction method, which boosts computational efficiency and reduces detection pedestrian error probability by picking out effective feature data, has become significant challenges that need to be addressed.

SUMMARY OF THE INVENTION

To obviate or at least alleviate the problems encountered in the prior art, it is an objective of the present invention to provide an image adaptive feature extraction method. The image adaptive feature extraction method includes (A) dividing an image into a plurality of blocks, performing a feature extraction processing on the plurality of blocks, and obtaining a block feature from each of the plurality of blocks after the feature extraction processing; (B) calculating each block feature by means of a support vector machine (SVM) classifier, wherein each block feature is calculated to obtain a hyperplane normal vector; and (C) setting a threshold value, determining the block feature according to the hyperplane normal vector, recording the block as an adaptive feature block when a value of the hyperplane normal vector is higher than the threshold value, and integrating each adaptive feature block to form an adaptive feature image. Because an image adaptive feature extraction process is performed before a pedestrian image detection is calculated, and effective feature data is then selected, computational efficiency is boosted and detection pedestrian error probability is reduced.

In the image adaptive feature extraction method of the present invention, the feature extraction processing may be a histogram of oriented gradients (HOG), a local binary pattern (LBP), or a histogram of local intensity difference (HLID).

Another embodiment of the present invention provides a pedestrian thermal image detection method, the pedestrian thermal image detection method includes steps of: (A) reading a raw thermal image (sometimes also referred to as thermal radiation image), wherein the raw thermal image includes a specific ambient information; (B) dividing the raw thermal image into a plurality of blocks, performing pedestrian a feature extraction processing on the plurality of blocks, and obtaining a block feature from each of the plurality of blocks after the pedestrian feature extraction processing; (C) calculating each block feature by means of a support vector machine (SVM) classifier, wherein each block feature is calculated to obtain a hyperplane normal vector; (D) setting a threshold value, determining the block feature according to the hyperplane normal vector, recording the block as an adaptive feature block when a value of the hyperplane normal vector is higher than the threshold value, and integrating each adaptive feature block to form an pedestrian feature image; and (E) performing a pedestrian image detection by means of the pedestrian feature image.

In the pedestrian thermal image detection method of the present invention, the pedestrian image detection is a histogram of oriented gradients (HOG).

In the pedestrian thermal image detection method of the present invention, the pedestrian image detection is a local binary pattern (LBP).

In the pedestrian thermal image detection method of the present invention, the pedestrian image detection is a histogram of local intensity difference (HLID).

In the pedestrian thermal image detection method of the present invention, the specific ambient information includes a pedestrian image.

In the pedestrian thermal image detection method of the present invention, the support vector machine (SVM) classifier is trained by using static humanoid sample data as a training sample database.

In the pedestrian thermal image detection method of the present invention, the support vector machine (SVM) classifier is trained by using a probe-six dataset as a test database.

Other objectives, advantages and features of the present invention will be apparent from the following description referring to the attached drawings.

These and other objectives of the present invention will no doubt become obvious to those of ordinary skill in the art after reading the following detailed description of the preferred embodiment that is illustrated in the various figures and drawings.

DETAILED DESCRIPTION

In the following description, for purposes of explanation, numerous specific details are set forth in order to provide a thorough understanding of one or more aspects of the present invention. It may be evident, however, to one skilled in the art that one or more aspects of the present invention may be practiced with a lesser degree of these specific details.

Figure 1:
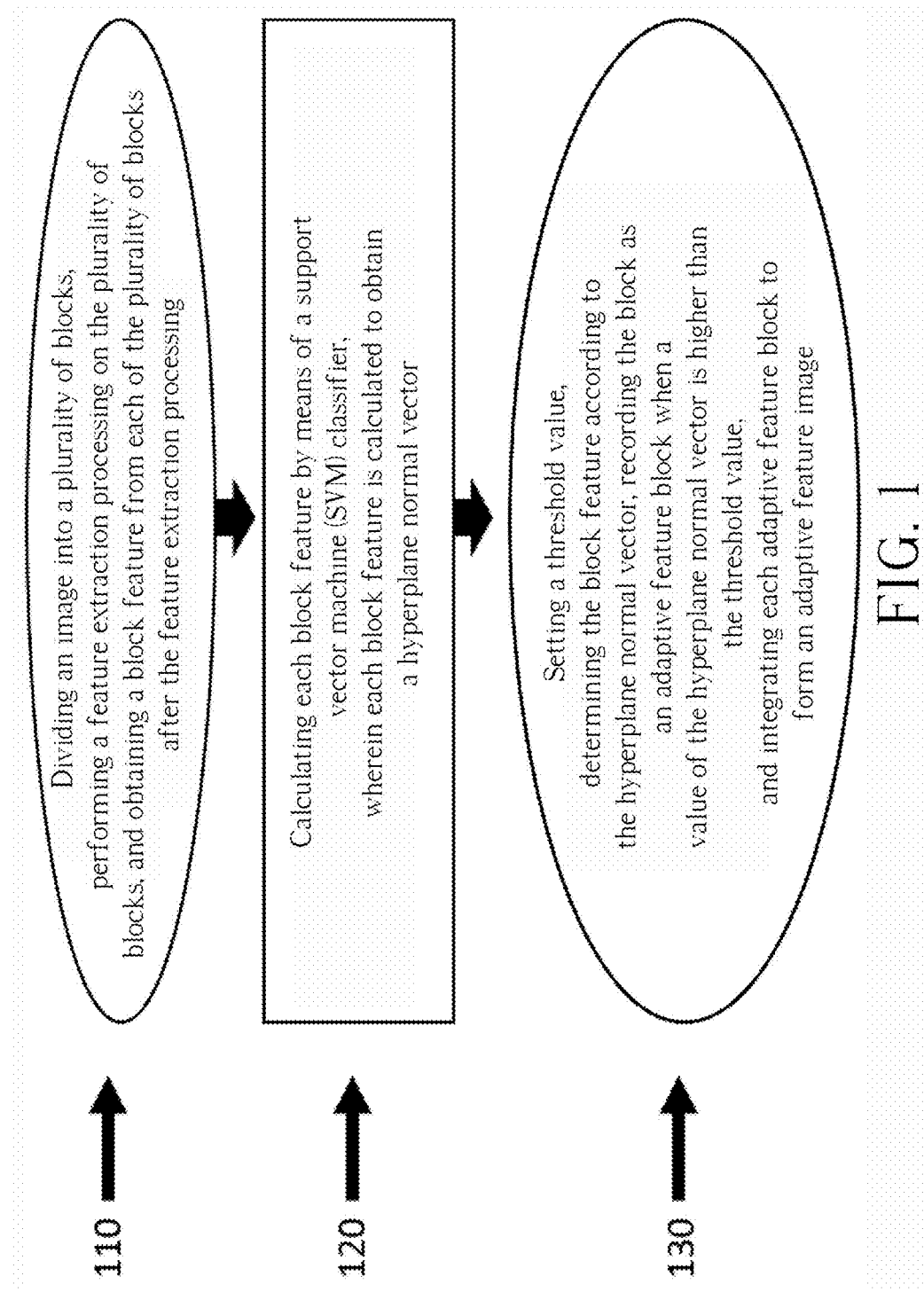
FIG. 1 is a flowchart of steps of an image adaptive feature extraction method according to an example of the present invention.

Please refer to FIG. 1, which is a flowchart of steps of an image adaptive feature extraction method according to an example of the present invention. The steps of the image adaptive feature extraction method include:

Step 110 (A) dividing an image into a plurality of blocks, performing a feature extraction processing on the plurality of blocks, and obtaining a block feature from each of the plurality of blocks after the feature extraction processing;

Step 120 (B) calculating each block feature by means of a support vector machine (SVM) classifier, wherein each block feature is calculated to obtain a hyperplane normal vector; and Step 130 (C) setting a threshold value, determining the block feature according to the hyperplane normal vector, recording the block as an adaptive feature block when a value of the hyperplane normal vector is higher than the threshold value, and integrating each adaptive feature block to form an adaptive feature image.

Another embodiment of the present invention provides a pedestrian thermal image detection method. The steps of the pedestrian thermal image detection method include:

(A) reading a raw thermal image, wherein the raw thermal image includes a specific ambient information;

(B) dividing the raw thermal image into a plurality of blocks, performing a pedestrian feature extraction processing on the plurality of blocks, and obtaining a block feature from each of the plurality of blocks after the pedestrian feature extraction processing;

(C) calculating each block feature by means of a support vector machine (SVM) classifier, wherein each block feature is calculated to obtain a hyperplane normal vector;

(D) setting a threshold value, determining the block feature according to the hyperplane normal vector, recording the block as an adaptive feature block when a value of the hyperplane normal vector is higher than the threshold value, and integrating each adaptive feature block to form an pedestrian feature image; and (E) performing a pedestrian image detection by means of the pedestrian feature image.

The feature extraction processing may be a histogram of oriented gradients (HOG), a local binary pattern (LBP), or a histogram of local intensity difference (HLID). However, the present invention is not limited thereto, and an appropriate feature extraction processing may be employed according to an object feature to be detected.

Different from a direct cascade method employed in conventional techniques, the present invention proposes a concept that properties of applied regions vary because characteristics of thermal image pedestrian features differ.

The invention selects appropriate feature combinations, which is called adaptive feature, according to object block characteristics by means of a feature selection algorithm. First, an image is divided into several blocks. Each of the blocks is described with all the aforementioned features. Then a block feature is formed by cascading the selected k features in a feature selection procedure (or a feature extraction processing). To ensure that the selected features conform to characteristics of the SVM classifier, a feature selection concept is that the hyperplane obtained by the SVM is a feature weighting (also referred to as a feature weight).

Figure 2:
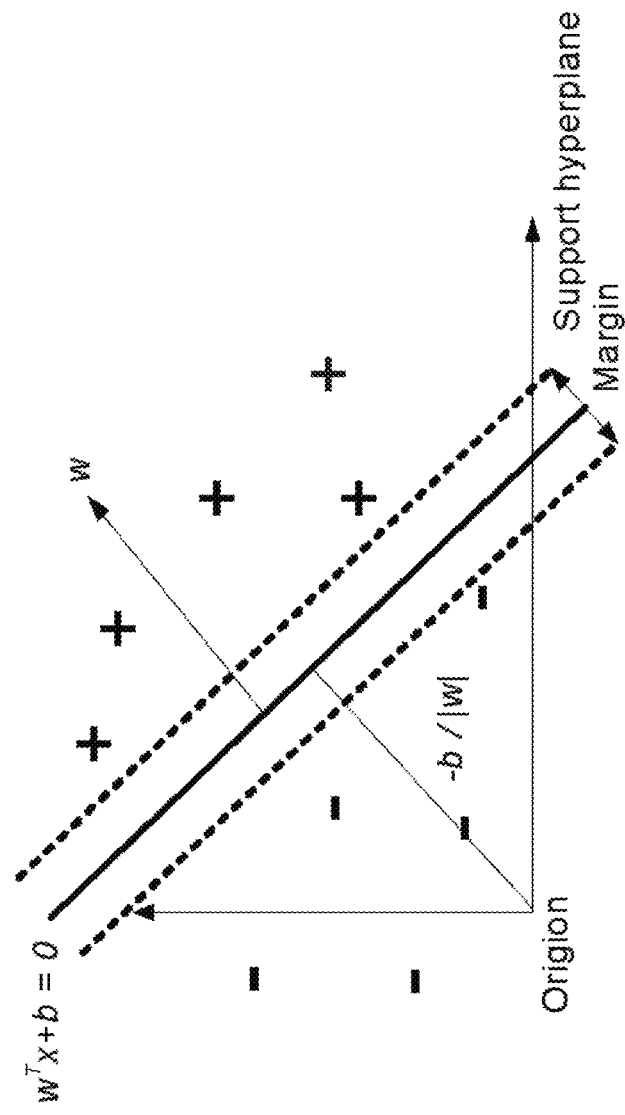
FIG. 2 is a schematic diagram of a hyperplane of a support vector machine (SVM) according to an example of the present invention.

Please refer to FIG. 2, which is a schematic diagram of a hyperplane of a support vector machine (SVM) according to an example of the present invention. The support vector machine (SVM) is a classification algorithm, which is mainly based on a new machine learning method proposed by a statistical learning theory. SVM maps vectors into a higher-dimensional space, and two kinds of information are distributed in this space. The hyperplane that classifies and separates the two kinds of information has two parallel hyperplanes on both sides. The hyperplane (namely, a black solid line from the upper left to the lower right in FIG. 2) for separation is chosen to maximize a distance between the two parallel hyperplanes (namely, a black dotted line from the upper left to the lower right in FIG. 2). The larger the difference or the distance between the two parallel hyperplanes is, the smaller the total error of the classifier would be. Suppose that two types of image sets of pedestrians and non-pedestrians using N-dimensional vectors are classified by SVM as $\{(x_i, y_i), i=1, 2, \ldots, n\}$, $x_i \in R^d$, $y_i \in \{+1, -1\}$, where $x_i$ is feature information extracted for the training image, and $y_i$ represents attribute of the image itself. $y_i$ is "+1" when belonging to a positive sample; $y_i$ is "−1" when belonging to a negative sample. The hyperplane may be written in mathematical form of $f(x) = w^T + b$, where w is a normal vector of the hyperplane, b is an offset, and $$\frac{-b}{|w|}$$

represents a distance between the origin and the hyperplane. An objective of the SVM is to find a hyperplane f(x) that has the maximum margin. When $f(x) > 0$, the test image information is classified as pedestrian; otherwise (when $f(x) < 0$) the test image information is classified as non-pedestrian.

Suppose that the image is divided into 105 blocks. If a linear SVM is adopted, the obtained SVM classifier is a linear combination of all the features in the blocks, and is written as the following equation:

$$f(x) = w^T x + b = \begin{pmatrix} \tilde{w}_1 \\ \tilde{w}_2 \\ \ldots \\ \tilde{w}_{105} \end{pmatrix}^T \begin{pmatrix} B_1 \\ B_2 \\ \ldots \\ B_{105} \end{pmatrix} + b$$

Where $\tilde{w}_1$ may be regarded as a linear combination of all the features $B_1$ and may be further written as:

$$\tilde{w}_1 B_1 = \begin{pmatrix} \tilde{w}_{1,HOG} \\ \tilde{w}_{1,HLID} \\ \cdots \\ \tilde{w}_{1,|f|} \end{pmatrix}^T \begin{pmatrix} B_{1,HOG} \\ B_{1,HLID} \\ \cdots \\ B_{1,|f|} \end{pmatrix}$$

Where |f| represents the number of the used features, its corresponding $\tilde{w}$ may be regarded as the importance of the feature and may serve as a basis for filtering features. Therefore, the feature weightings used in the present invention are defined as follows:

$$\alpha_{1,HOG} = \|w_{1,HOG}\|_2, \alpha_{1,HLID} = \|w_{1,HLID}\|_2.$$

According to the aforementioned feature weighting definition, the feature selection algorithm of the present invention may be named as recursive feature elimination. The recursive feature elimination may include:
Initialization: s=[1, 2, 3, ..., n], and n=|B|×|f|.
Stop Condition: Each feature has k features being selected.
Recursive Step may include:
Step 1: training an SVM classifier to achieve w=SVM(s);
Step 2: calculating weightings α in all feature sets s and performing sorting;
Step 3: selecting a weighting for all the blocks with more than k features, wherein the smallest feature satisfies p=arg min(α);
Step 4: updating the feature set s=[1:p−1,p+1:length(s)].

Figure 3:
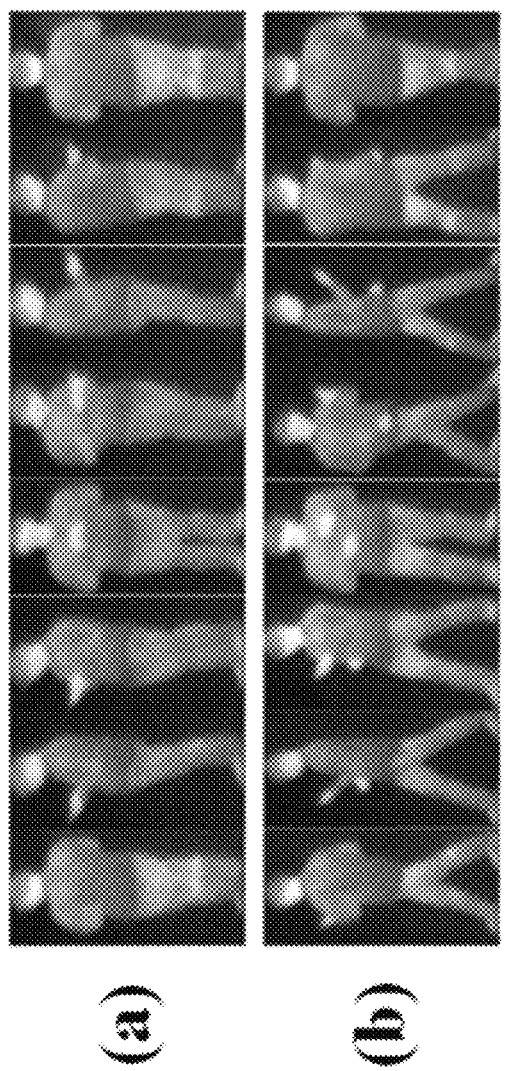
FIG. 3 is a schematic diagram of an adaptive feature sampling according to an example of the present invention.

Please refer to FIG. 3, which is a schematic diagram of an adaptive feature sampling according to an example of the present invention. The databases used in this embodiment are two thermal image databases, which are a static (humanoid samples) dataset and a probe-six dataset, built from the thermographic camera FLIR Tau2. Resolution of the databases may be 640×480 of a 14-bit thermal image. The static dataset aims to provide a variety of thermal image pedestrian templates for use in feature capture and classifier learning mainly by controlling shooting manners and pedestrian positions. How clear pedestrians in the image by means of shooting with visible light camera will look is susceptible to ambient light source or ambient color. Images of objects in the thermographic camera are liable to be influenced by material or ambient temperature. The ambient temperature has the most obvious effect on the thermal image. In order to observe images of pedestrians at different ambient temperatures, there are two shooting timings, which are categorized into "daytime" and "nighttime" based on the presence or absence of sunlight. To cooperate with shooting models, the two shooting timings (namely, the timings for filming or photographing) would be 14:00 to 16:00 and 19:00 to 21:00 respectively. Shooting scenes are selected to simulate the real world. Backgrounds are roughly classified into three types: those in the interior, around buildings, and in nature. Because temperature in the interior (scene) is lower, pedestrian profiles are strong, and the background is flat. Nevertheless, the interior (scene) is prone to heat reflection. Since a building (scene) is located outside, images from the thermographic camera may be affected by sunshine. Temperatures of the buildings subject to sunshine would rise to temperatures of pedestrians, thereby increasing difficulty in identifying pedestrians. Moreover, the background is more complicated with respect to time variation. Outline of trees are most similar to those of pedestrians in pedestrian detection in nature (scene). Whether in the daytime and nighttime, trees are hotter than the background in nature (scene), misjudgments are thus likely to be made. In the aforementioned three scenarios, pedestrian samples of different distances, which are classified according to safe driving distances, are photographed or filmed. Suppose that a vehicle is moving on a surface street, and suppose that the speed limit is substantially in a range of 40 to 70 kilometers (Km). After the driver notices anything unusual, a buffer distance required for stopping the vehicle is substantially in a range of 22 to 58 meters. Therefore, four distances (namely 30, 40, 50, and 60 meters) are taken. To fully present pedestrian contours at different distances, in this embodiment, there are eight orientations in total as shown in FIG. 3, and two postures are simulated. An orientation is defined by rotating a shooting model by 45 degrees when the shooting model spins 360 degrees around its axis. The two postures may be a standing posture as shown in row (a) of FIG. 3 and a walking posture as shown in row (b) of FIG. 3.

Probe-six dataset includes six basic database of different scenes in the daytime and nighttime. Each image sequence includes 50 images. In this embodiment, a scene numbered one is photographed in a wide indoor area in a campus activity center. This indoor area is usually a square for student activities. The lights are bright, so visible light and thermal images may be clearly presented. A scene numbered two is a campus cement walkway during the daytime. The cement walkway would heat up due to sun exposure. When the shooting time is two o'clock in the afternoon, temperature of the cement walkway is so close to temperatures of pedestrians that the thermal image in the scene numbered two is relatively unfavorable. A scene numbered three is the same as the scene numbered two, but the scene numbered three is shot in the nighttime. At night, it is illuminated only by scattered street lights on both sides of the cement walkway, and temperature of the ground drops due to sunset. The visible light in the scene numbered three would thus be poorer than the thermal image. A scene numbered four, which is a turf in the nighttime without street lighting, is a challenge. In terms of visible light, pictures can only be shot with noise by means of large camera aperture in a violent struggle. Although thermal images may be clearly shot at night, temperatures of trees, which are exposed to the sun during the daytime, in the background are close to human temperatures, causing that grain pattern features of the trees are quite close to those of pedestrians. Scenes numbered five and six are images taken on a vehicle traveling forward. In the scene numbered five, there is only one single pedestrian moving simply. In the scene numbered six, two pedestrians and one humanlike object (for example, a bicycle) move to enter or exit the scene numbered six. The aforementioned databases are utilized to train adaptive features in exemplary embodiments, but the present invention is not limited thereto, and more accurate and precise adaptive features may be trained by more diverse databases.

Figure 4:
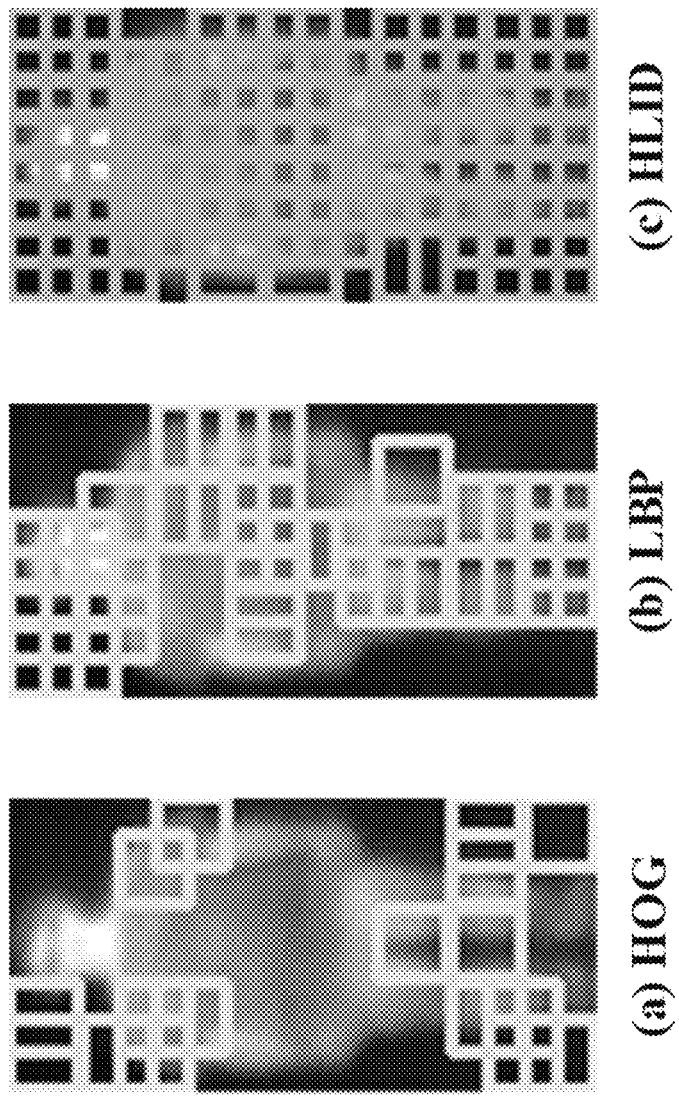
FIG. 4 is a schematic diagram of a pedestrian thermal image detection method according to an example of the present invention.

Please refer to FIG. 4, which is a schematic diagram of a pedestrian thermal image detection method according to an example of the present invention. In an analysis of the pedestrian thermal image detection method of this embodiment, the static (humanoid samples) dataset serves as a training database, and the probe-six dataset serves as a testing database. Based on the aforementioned experimental settings, performance differences between (1) non-adaptive features cascading all the features and (2) adaptive features of the selected features are analyzed. For a humanoid sample divided into 7×15 blocks, each block is currently described with three commonly used grain pattern features, which are a histogram of oriented gradients (HOG), a local binary pattern (LBP), and a histogram of local intensity difference (HLID), in literatures. In this embodiment, the three grain pattern features have dimension of 36, 59, and 32 respectively as a prominent attribute. FIG. 4 shows adaptive features obtained from the feature selection algorithm of the present invention, wherein columns (a), (b), and (c) respectively correspond to the blocks of the aforementioned three grain pattern features. The employed integrations of the grain pattern features corresponding to different blocks vary. Dimension of the adaptive feature obtained is 5257. Compared with the non-adaptive feature (namely, a conventional method cascading all the features), the dimension of which is 105×(36+59+32)=13335, a raw thermal image effectively reduces the dimension presenting features from 13335 to 5257 according to the method of the present invention. Moreover, a pedestrian image detection computation is speed up by 2.54 times. The classification accuracy of a pedestrian image detection is improved from 0.903 to 0.926. Accordingly, with feature selection mechanism for adaptive features in the pedestrian thermal image detection method of the present invention, feature dimension and feature correlation may be effectively reduced, and effective features may be maintain, thereby improving feature representation speed and accuracy simultaneously.

Although the invention has been shown and described with respect to one or more implementations, equivalent alterations and modifications will occur to others skilled in the art based upon a reading and understanding of this specification and the annexed drawings. The invention includes all such modifications and alterations and is limited only by the scope of the following claims. In addition, while a particular feature of the invention may have been disclosed with respect to only one of several implementations, such feature may be combined with one or more other features of the other implementations as may be desired and advantageous for any given or particular application.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image adaptive feature extraction method, comprising steps of:
    (A) dividing an image into a plurality of blocks, performing a feature extraction processing on the plurality of blocks, and obtaining a block feature from each of the plurality of blocks after the feature extraction processing, wherein the feature extraction processing involves more than one of a histogram of oriented gradients, a local binary pattern, and a histogram of local intensity difference;
    (B) calculating each block feature by means of a support vector machine classifier, wherein each block feature is calculated to obtain a hyperplane normal vector; and
    (C) setting a threshold value, determining the block feature according to the hyperplane normal vector, recording the block as an adaptive feature block when a value of the hyperplane normal vector is higher than the threshold value, and integrating each adaptive feature block to form an adaptive feature image.

2. A pedestrian thermal image detection method, comprising steps of:
    (A) reading a raw thermal image, wherein the raw thermal image comprises a specific ambient information;
    (B) dividing the raw thermal image into a plurality of blocks, performing a pedestrian feature extraction processing on the plurality of blocks, and obtaining a block feature from each of the plurality of blocks after the pedestrian feature extraction processing, wherein the pedestrian feature extraction processing involves more than one of a histogram of oriented gradients, a local binary pattern, and a histogram of local intensity difference;
    (C) calculating each block feature by means of a support vector machine classifier, wherein each block feature is calculated to obtain a hyperplane normal vector;
    (D) setting a threshold value, determining the block feature according to the hyperplane normal vector, recording the block as an adaptive feature block when a value of the hyperplane normal vector is higher than the threshold value, and integrating each adaptive feature block to form an pedestrian feature image; and
    (E) performing a pedestrian image detection by means of the pedestrian feature image.

3. The pedestrian thermal image detection method according to claim 2, wherein the pedestrian image detection is the histogram of oriented gradients.

4. The pedestrian thermal image detection method according to claim 2, wherein the pedestrian image detection is the local binary pattern.

5. The pedestrian thermal image detection method according to claim 2, wherein the pedestrian image detection is the histogram of local intensity difference.

6. The pedestrian thermal image detection method according to claim 2, wherein the specific ambient information comprises a pedestrian image.

7. The pedestrian thermal image detection method according to claim 2, wherein the support vector machine classifier is trained by using static humanoid sample data as a training sample database.

8. The pedestrian thermal image detection method according to claim 2, wherein the support vector machine classifier is trained by using a probe-six dataset as a test database.

* * * * *